Figure 1:
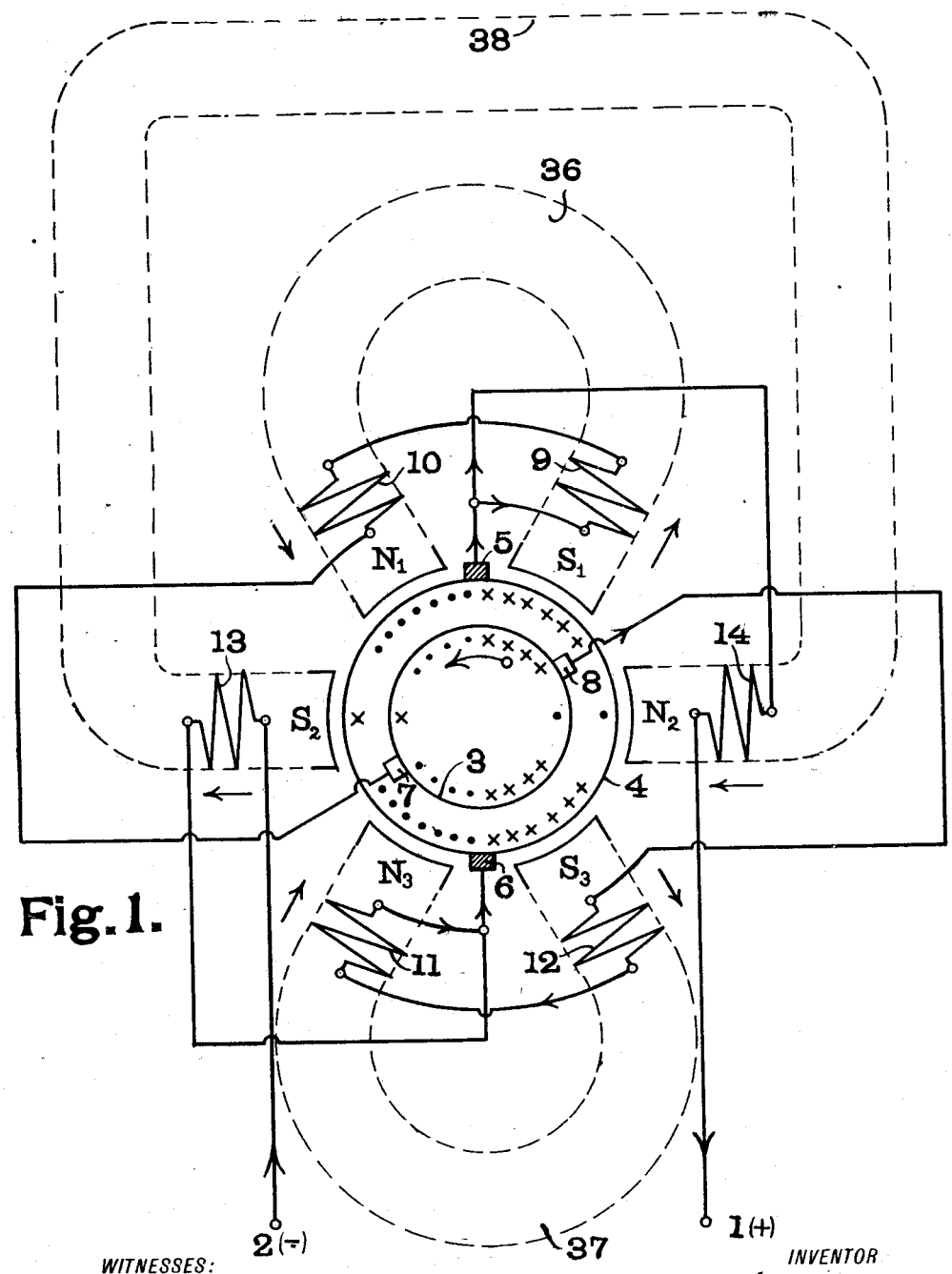

V. A. FYNN.
DYNAMO ELECTRIC MACHINE.
APPLICATION FILED JUNE 17, 1911.

1,104,184.

Patented July 21, 1914.
3 SHEETS—SHEET 2.

WITNESSES:
L. L. Mead
W. H. Alexander

INVENTOR
Valère A. Fynn
E. E. Huffman
ATTORNEY

V. A. FYNN.
DYNAMO ELECTRIC MACHINE.
APPLICATION FILED JUNE 17, 1911.

1,104,184.

Patented July 21, 1914.
3 SHEETS—SHEET 3.

WITNESSES:
L. L. Mead
W. H. Alexander

INVENTOR
Valère A. Fynn,
BY
ATTORNEY

UNITED STATES PATENT OFFICE.

VALÈRE ALFRED FYNN, OF LONDON, ENGLAND, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,104,184.  Specification of Letters Patent.  Patented July 21, 1914.

Application filed June 17, 1911. Serial No. 633,759.

*To all whom it may concern:*

Be it known that I, VALÈRE ALFRED FYNN, a subject of the King of England, residing at London, England, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates to dynamo electric machines and particularly to those required to run at widely varying speeds and to charge storage batteries.

My objects are to produce a dynamo suitable for such service in which as little material as possible will be required at low speeds and which will have good commutating properties throughout its whole range of operation.

In all such dynamos it is necessary to reduce the effective magnetization of the machine with increasing speed or with increasing current output. I accomplish this reduction by causing the effective exciting E. M. F. to suitably change its magnitude and in some instances I supplement this reduction of the effective exciting E. M. F. by means of a magneto motive force adapted to influence the terminal voltage of the machine directly as well as indirectly. The direct influence of this M. M. F. on the terminal voltage is obtained by causing said M. M. F. to directly affect the magnitude of the effective magnetization of the machine. Its indirect influence is obtained by affecting the effective magnetization of the machine in such a way as to thereby also affect the magnitude of the effective exciting E. M. F.

In carrying my invention into practice I provide an armature wound for $n$ poles and place it in a field structure in which can be produced either $n$ or $3n$ electrical poles. Thus in one form of my improved dynamo I make use in connection with an $n$ pole armature of a field structure provided with $3n$ mechanical poles. In all cases I derive the exciting E. M. F. from the armature itself and to this end I make use of main brushes and of at least one exciting brush displaced from the nearest main brush by $120/n$ degrees connecting all the main exciting windings between one main and one exciting or auxiliary brush or dividing the main exciting windings into two groups and connecting each between a main and an auxiliary brush. This displacement of the brushes in connection with the field structure having $3n$ mechanical poles allows each of said brushes to be placed in an interpolar space. At low speeds I prefer to magnetize adjacent sets of three mechanical poles in opposite directions thus obtaining the equivalent of an $n$-pole field structure and utilizing the available material to the best advantage. At high speed I prefer to magnetize adjacent mechanical poles in opposite directions thus obtaining a true $3n$ pole field structure. While a $3n$ pole field is not economical in connection with an $n$-pole armature yet it should be remembered that the effective magnetic flux required at high speeds is of course very much smaller than at the low speeds and a true $3n$ pole field can therefore be used without necessitating an increase in the size of the machine. The advantage of a true $3n$ pole field is that each brush can then be placed not only in an interpolar space but in a true neutral zone thus greatly improving the commutation conditions. The greatest commutating difficulties arise at the higher speeds and it is for this reason that I prefer to work with a $3n$ pole field at those higher speeds. At the lower speeds the commutation does not present any serious difficulties and I prefer to work with an $n$-pole field thus making the fullest use of the active material at a time when I require the greatset amount of such material. In order to change the polarity of the field from $n$ to $3n$ poles I prefer to make use of a M. M. F. which affects the terminal voltage of the machine directly as well as indirectly.

My invention will be better understood by reference to the accompanying diagrammatic drawings in which—

Figure 2:
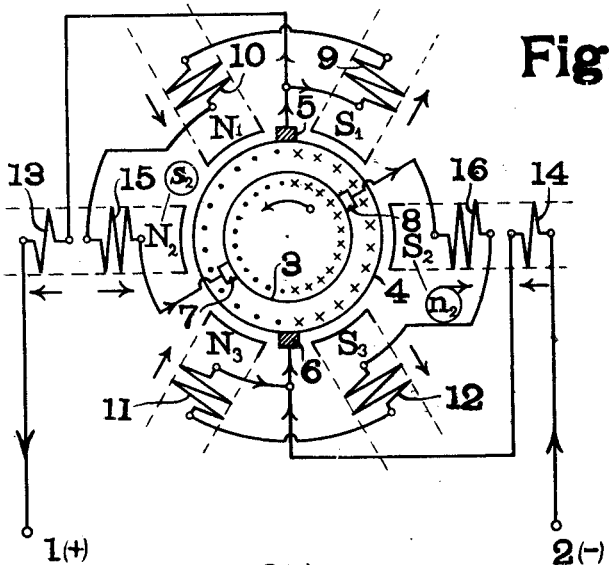
Figure 3:
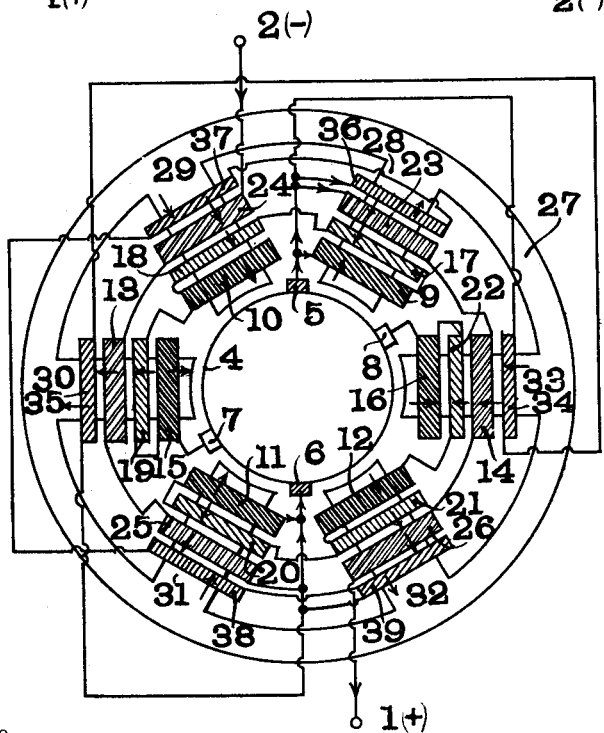
Figure 4:
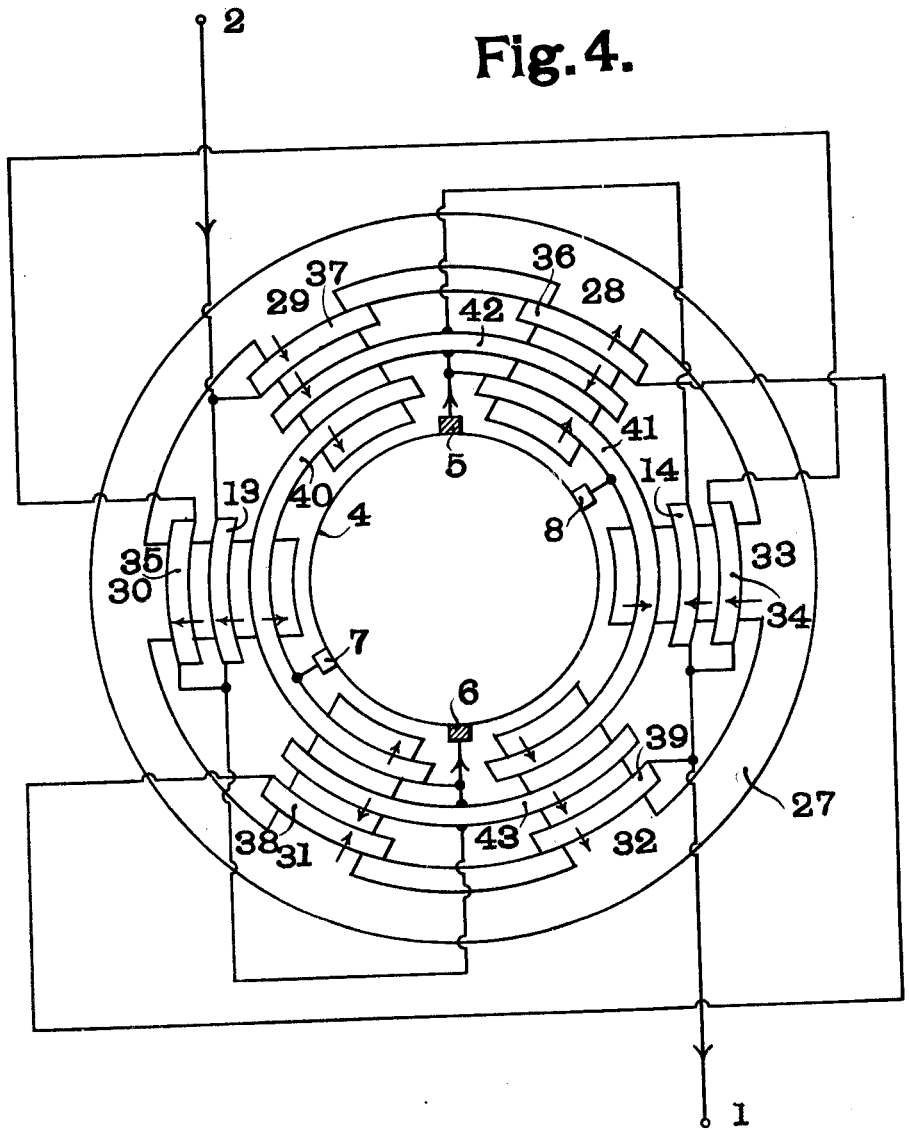

Figure 1 shows a simple form of my invention; Fig. 2 indicates an arrangement by which the active material is more fully utilized than in Fig. 1; Fig. 3 shows the preferred form of the dynamo and Fig. 4 shows a modified mechanical disposition of the field coils of Fig. 3.

Referring to Fig. 1 the rotor carries two commuted two-pole windings 3, 4 preferably located in the same slots, but shown for the sake of convenience by two concentric circles in the figure. The field structure is ilcomposed of three independent magnets 36, 37, 38, each having two poles and each of these poles embracing rather less than one-sixth of the circumference of the armature or rotor. The poles $N_1 S_1$ and $N_3 S_3$ of the magnets 36 and 37 embrace adjacent sections of the armature, while the poles $N_2 S_2$ of magnet 38 embrace armature sections which are located midway between the sections embraced by the poles of the magnets 36 and 37. The main brushes 5 and 6 are so located as to short circuit coils lying between the adjacent poles of the magnets 36 and 37, while the auxiliary brushes 7, 8 are displaced from the main brushes 5, 6 by 60 electrical degrees. Brush 7 is located between a pole of the magnet 37 and a pole of the magnet 38; while brush 8 is located between a pole of the magnet 36 and a pole of the magnet 38. Each of the poles carry exciting coils. The main exciting coils 9, 10, 11, 12 are located on the poles of the magnets 36 and 37 and are connected in series between the main and the auxiliary brushes. This exciting circuit can be traced as follows: From the main brush 5, through the exciting coil 9 on the pole $S_1$ to the coil 10 on the pole $N_1$ to brush 7, through the commuted winding 3 to brush 8, through coil 12 on the pole $S_3$ to coil 11 on the pole $N_3$, to the main brush 6, and back to the main brush 5 by way of the commuted winding 4. The reversing coil 13 located on the pole $S_2$ is connected between the main brush 6 and the terminal 2 of the dynamo, while the reversing coil 14 is connected between the main brush 5 and the terminal 1. The translating device to be operated by this dynamo is, of course, to be connected to the terminals 1 and 2. The operation of this simplest form of my invention is somewhat as follows:

Assuming the connections to be such as shown and the machine to be running on open circuit and in a counterclockwise direction then the remnant magnetization will cause an exciting current to flow through the coils 9, 10, 11, 12 assumed in the figure to flow in the direction indicated by the arrows,—that is, from the brush 5 to the brush 6, thus magnetizing the poles of the magnets 36 and 37 as indicated by the capital letters designating their polarity. No current will flow through coils 13 and 14 as long as there is no load on the machine and the poles $N_2$ and $S_2$ will therefore be neutral except for such remnant magnetism as may be present in said poles. The conditions will be identical with those obtained in an ordinary two-pole dynamo with the exception that each of the magnetic poles is here split into two mechanical ones, thus the north pole is composed of the pole $N_1$ belonging to the magnet 36 and $N_3$ belonging to magnet 37, while the south pole is similarly divided. Only part of the armature conductors will be active under these conditions. These conductors are indicated by dots and crosses placed inside the circles illustrating the two armature windings. It is seen that all the E. M. F.'s generated in the winding 4 are added at the brushes 5 and 6, while all the E. M. F.'s generated at the winding 3 cancel each other with respect to the brushes 7, 8 and the voltage appearing at said brushes is therefore zero. At no-load and at any speed the excitation of the machine is therefore only dependent on the E. M. F. generated at the brushes 5, 6. Since the poles $S_2$ and $N_2$ are neutral then the corresponding armature segments are idle and the material of the machine is not utilized to the best advantage. It is to be observed that the armature reaction due to any current circulating in the winding 4 and directed by the brushes 5, 6 cannot set up any appreciable flux because of the lack of all magnetic connection between the magnets 36 and 37. The current circulating in the winding 3 by way of the brushes 7, 8 is comparatively small but part of the ampere turns due to it can produce a flux through 36 or 37. Any such flux may as a rule be safely neglected.

As soon as the dynamo is loaded then the load current circulates through the reversing coils 13, 14 and magnetizes the poles of the magnet 38 proportionally to the load. In Fig. 1 these reversing coils are so connected as to magnetize said poles in a manner to secure a true 6 pole field, as indicated by the capital letters, thus affecting the magnitude of the effective magnetization of the machine. The M. M. F. set up by the coils 13, 14 is responsible for an E. M. F. in the commuted winding 4, the direction of which is indicated by a single dot and a single cross placed on the center line of the poles $N_2 S_2$, and it is seen that this E. M. F. opposes that generated in the other sections of that winding. In this way the M. M. F. produced by the coils 13, 14 directly affects the magnitude of the terminal voltage of the machine. The M. M. F. due to the coils 13 and 14 also produces an E. M. F. in the winding 3 which I will refer to as back E. M. F. and which appears at the brushes 7, 8 and is of opposite direction to the E. M. F. generated and appearing at the brushes 5, 6. In this way said M. M. F. indirectly affects the magnitude of the terminal voltage by reducing the effective exciting E. M. F. It will thus be seen that the effective magnetization of the machine will diminish very rapidly with increasing load and regardless of the nature of said load, because of the increase in the magnetization due to the coils 13, 14 and because of the consequent decrease in the magnetization due to the coils 9, 10, 11, 12. The amount by which the terminal voltage will vary with the varying speed mainly depends upon the number of turns of the coils 13 and 14. If the machine is connected to a storage battery then the magnetization due to the coils 9, 10, 11, 12 will decrease still more rapidly with increasing speed and load because the back E. M. F. generated at the brushes 7, 8 by rotation in the flux due to the coils 13, 14 will vary as before while the main E. M. F. appearing at the brushes 5, 6 will be kept practically constant by the storage battery connected thereto.

The foregoing description indicates that the objects aimed at are only partly achieved by the arrangement shown in Fig. 1, but the explanation of the mode of operation of that simple arrangement will make it easier and simpler to explain the mode of operation of the more complete arrangement shown in Fig. 2. The latter differs from the former in that the poles $N_2$ $S_2$ forming the central portions of the two groups of mechanical poles $N_1$ $N_2$ $N_3$ and $S_1$ $S_2$ $S_3$ are also provided with main exciting coils 15, 16 included between the main and the auxiliary brushes. The coils 15 and 16 are so connected as to magnetize these middle poles in the manner indicated by the capital letters, thus producing a true 2-pole field, each electrical pole of which is divided up into three mechanical poles of like polarity. At no load the whole of the active material is therefore fully utilized and the voltages generated in the commuted winding 4 are all added at the brushes 5 and 6. The voltage appearing at the brushes 7, 8 however only amounts to about ⅓ of the total voltage generated in the winding 3. This is due to the fact that the auxiliary brushes are displaced by 60 electrical degrees from the neutral axis of the 2-pole field. The connections are such that the auxiliary E. M. F. appearing at the auxiliary brushes at no load is added to the main E. M. F. appearing at the main brushes, the effective exciting E. M. F. then being equal to the sum of the two E. M. F.'s. When the load current flows through the reversing coils 13 and 14 then the total magnetization of the poles $S_2$ $N_2$ is reduced because coils 13 and 14 are so connected as to oppose coils 15, 16 and the point is soon reached when the magnetization of these middle poles becomes zero, thus reëstablishing the conditions obtaining in Fig. 1 at no load. As the load increases the middle poles are magnetized in an opposite direction and therefore change their polarity, $S_2$ becoming a north pole ($n_2$) and $N_2$ a south pole ($s_2$). When the middle poles are neutral the auxiliary voltage appearing at the brushes 7, 8 and which at first assisted the main voltage appearing at brushes 5, 6, is zero and the effective exciting E. M. F. equals the main E. M. F. When the middle poles reverse their polarity then the auxiliary voltage at the brushes 7, 8 also reverses its direction and now opposes the main voltage, and the effective exciting E. M. F. is now the difference between the main and the auxiliary E. M. F. The shunt excitation of the machine and its effective magnetization therefore decrease rapidly with increasing speed and increasing load.

It has been stated in connection with Fig. 1 that no armature reaction flux can be present as long as the three groups of poles clearly indicated in that figure are magnetically independent. It is, however, by no means necessary that this should be the case. It is quite possible to operate such machines successfully even when all the mechanical poles are magnetically linked and it is often desirable to do so. A construction with magnetically linked poles is also considerably more convenient in practice than the magnetically independent structure diagrammatically indicated in Fig. 1. The armature reaction flux is of course proportional to the current output. It has no direct influence on the terminal voltage of the machine but it does affect the auxiliary voltage at the brushes 7, 8 in just the same way as does the flux due to the reversing coils 13, 14. The armature reaction flux therefore also tends to reduce the effective exciting voltage of the machine but does not reduce it quite as rapidly as the reversing coils 13 and 14. It follows that the load characteristic of the machine will be of the same general character whether the reduction of the effective exciting E. M. F. is brought about by the reversing coils 13, 14 or by armature reaction but there will be a difference in degree between the two load characteristics. This condition makes it possible for the designer to adjust the characteristic to the shape required by making use of the armature action only, of the reversing coils only, or of a combination of the two means. When all the mechanical poles have a common magnetic yoke it then becomes necessary to make provision for destroying or controlling the armature reaction due either to the working or the exciting armature currents. One way of controlling these armature reactions is shown in Fig. 3. It is because of the possibility of using magnetically independent, as well as magnetically dependent polar projections, that the Fig. 2 has been left indefinite as to the formation of the field structure.

In Figs. 1 and 2 the armature is shown provided with two commuted windings. While such a construction is possible it is undesirable from a practical point of view and was only illustrated in order to simplify the description of the mode of operation of these machines.

It will readily be understod by those skilled in the art that the two commuted windings can be replaced by a single winding and that this construction would naturally be used in practice.

In Fig. 3 all the polar projections 28—29—30—31—32—33 are magnetically linked to each other by means of the yoke 27. The armature of Fig. 3 is wound for two poles and carries one commuted winding 4 only. The disposition of the main and auxiliary brushes is the same as in the previous figures. The main exciting coils 9, 10 and 15 are connected between the brushes 5 and 7, while the exciting coils 11, 12 and 16 are connected between the brushes 6 and 8. The armature reaction due to the exciting current circulating in the commuted winding 4 is taken care of by means of the coils 17, 18, 19, 20, 21 and 22 connected in series with the main exciting coils and producing a magnetization coaxial with the center line of the poles 28 and 31. It will be noticed that the coils 17 and 9 which are both located on the pole 28 are connected in series and produce oppositely directed magnetizations. It is clear that these two coils can be replaced by a single one, provided that this new coil is given a number of turns equal to the turns in 9 less the turns in 17. The coils 15, 19; 11, 20; and 16, 22 can be similarly combined, while the coils 18, 10; and 12, 21 produce magnetizations in the same direction and do not offer any material advantage if combined and replaced by a single coil. The armature reaction due to the load current is coaxial to the brush line 5, 6 and is taken care of to any desired extent by the neutralizing series coils 23, 24, 25 and 26. The reversing series coils 14, 13 control the magnitude and the polarity of the magnetization of the poles 30 and 33 in the same manner as in the previous figures. These middle or auxiliary poles 30 and 33 carry in addition coils 34 and 35 connected in parallel to the terminals or to the main brushes 5, 6 of the machine. The magnetization they produce is, therefore, proportional to the terminal voltage. They may be connected so as to help or so as to oppose the magnetization produced by the main exciting coils 15, 16 placed on the said poles.

When the dynamo is made use of for the purpose of charging storage batteries then the coils 34 and 35 can be connected so as to oppose the main exciting coils 15, 16 and assist the coils 13, 14, in which case they will tend to reduce the current supplied by the dynamo to the battery as the battery voltage increases. Their effect will not be very marked at low speeds, but it will be quite considerable at the higher speeds, and particularly when the polarity of the poles 30 and 33 has been reversed owing to the influence of the series coils 13, 14. This can be readily recognized from the fact that the coils 34, 35 magnetize in the same direction as the coils 13, 14. The latter tend to reduce the total magnetization of the machine and therefore the terminal voltage thereof. The former are connected to act in the same direction and must, therefore, produce the same result, their effect increasing with increasing terminal voltage.

Another way in which the shape of the load characteristic curve of the machine can be influenced is by the use of coils such as 36, 37, 38 and 39 connected in parallel to the main brushes 5, 6 and so disposed as to only influence that part of the flux threading the armature which does not affect the voltage at the auxiliary brushes 7, 8. To this end these coils are disposed on the poles 28, 29 31 and 32. If they are so connected as to magnetize in the same direction as the main exciting coils 9, 10, 11, 12 then they will have the tendency to prevent the characteristic curve from dropping rapidly with increasing speed and load. The greater the proportion of the total initial magnetization of the poles 28, 29, 31 and 32 supplied by these auxiliary coils 36, 37, 38 and 39 the higher will be the characteristic curve at a given high speed. If these auxiliary coils oppose the main exciting coils then a more drooping characteristic will be obtained. In order to secure the exact characteristic required for a particular make of storage battery it may be necessary to make use of a combination of all the various means for adjusting the characteristic of the machine shown in Fig. 3 but the neutralizing coils 17, 18, 19, 20, 21 and 22 designed to take care of the armature reaction due to the exciting current can usually be dispensed with. In other cases some only of the adjusting means need be employed and it is often possible to omit the neutralizing windings 23, 24, 25 and 26.

Fig. 4 shows a somewhat different mechanical arrangement of the principal coils shown in Fig. 3. The machines are however otherwise identical. The main exciting coils 10, 15, 11 and 9, 16, 12 of Fig. 3 have been replaced by single coils 40 and 41 respectively and each embracing three of the mechanical poles of the machine. Similarly the neutralizing coils 23, 24 and 25, 26 have been replaced by the single coils 42 and 43 each embracing two of the mechanical poles but producing identical magnetic effects as the corresponding coils of Fig. 3. The reversing coils 13, 14, the adjusting coils 34, 35 and 36, 37 38, 39 are identical with those of Fig. 3. The connections in Fig. 4 are the same as those of Fig. 3.

While I have described my invention as applied to generators with two-pole armatures, yet it will be readily understood that the invention is in no way restricted to generators, nor is it restricted to dynamo electric machines having two-pole armatures.

While it will be mostly convenient to dispose the neutralizing windings 23, 24, 25, 26 in the manner shown in Figs. 3 or 4, yet these windings will be quite as effective if disposed in slots provided in the vicinity of the pole faces and in a manner now well understood.

Having fully described my invention, what I claim as new and desire to secure by Letters Patent of the United States, is:

1. In a dynamo electric machine, the combination with a revolving member having an $n$-pole winding, main brushes and an auxiliary brush displaced by about $120/n$ degrees from a main brush, of a stationary member carrying coils adapted to produce a $3n$ pole field, certain of said coils being connected in series between a main and an auxiliary brush.

2. In a dynamo electric machine, the combination with a stationary member having $3n$ mechanical poles each provided with a coil, of a revolving member having an $n$-pole winding, main brushes and an auxiliary brush displaced by sixty electrical degrees from one of the main brushes, and means connecting certain of the coils on the stationary member in series with a main and an auxiliary brush.

3. In a dynamo electric machine, the combination with a stationary member having $3n$ mechanical poles $2n$ of which are each provided with a coil, of a revolving member having an $n$-pole winding, main brushes and an auxiliary brush displaced by about $120/n$ degrees from one of the main brushes, and means connecting certain of the coils on the stationary member in series with a main and an auxiliary brush.

4. In a dynamo electric machine, the combination with a stationary member having $3n$ mechanical poles $2n$ of which are each provided with a coil, of a revolving member having an $n$-pole winding, main brushes and an auxiliary brush displaced by about $120/n$ degrees from one of the main brushes, means connecting certain of the field coils in series with a main and an auxiliary brush, and means for producing an auxiliary magneto motive force on certain of the mechanical poles.

5. In a dynamo electric machine, the combination with a stationary member having $3n$ mechanical poles, of a revolving member having an $n$-pole winding, main brushes and auxiliary brushes displaced sixty electrical degrees from the main brushes, each brush being located between adjacent mechanical poles, main exciting coils on the poles adjacent to the main brushes and connected in series between a main and an auxiliary brush.

6. In a dynamo electric machine, the combination with a stationary member having $3n$ mechanical poles, of a revolving member having an $n$-pole winding, main brushes and auxiliary brushes displaced sixty electrical degrees from the main brushes, each brush being located between adjacent mechanical poles, main exciting coils on the poles adjacent to the main brushes and connected in series between a main and an auxiliary brush, and auxiliary coils on the remaining mechanical poles.

7. In a dynamo electric machine, the combination with a stationary member having $3n$ mechanical poles, of a revolving member having an $n$-pole winding, main brushes and auxiliary brushes displaced sixty electrical degrees from the main brushes, each brush being located between adjacent mechanical poles, main exciting coils on each mechanical pole, said coils being connected in series between a main and an auxiliary brush, and auxiliary coils located on poles displaced ninety electrical degrees from the main brushes.

8. In a dynamo electric machine, the combination with a stationary member having $3n$ mechanical poles, of a revolving member having an $n$-pole winding, main brushes and auxiliary brushes displaced sixty electrical degrees from the main brushes, each brush being located between adjacent mechanical poles, main exciting coils on each of the mechanical poles, said coils being connected in series between a main and an auxiliary brush.

9. In a dynamo electric machine, a stationary member having windings adapted to produce an $n$-pole field, a revolving member having an $n$-pole winding, and means dependent upon the load current for changing the stator field from an $n$-pole field to a $3n$ pole field and vice versa.

10. In a dynamo electric machine, a stationary member having windings adapted to produce an $n$-pole field, a revolving member having an $n$-pole winding and means for producing an additional magneto motive force which will operate to change the stator field from an $n$-pole field to a $3n$ pole field.

11. In a dynamo electric machine, a stationary member having $3n$ mechanical poles and windings adapted to produce an $n$-pole field distributed over all the mechanical poles, a revolving member having an $n$-pole winding, means dependent upon the load current for changing the stator field from an $n$-pole field to a $3n$ pole field and vice versa.

12. In a dynamo electric machine, a stationary member having $3n$ mechanical poles and windings adapted to produce an $n$-pole field distributed over all the mechanical poles, a revolving member having an $n$-pole winding, means for producing an additional magneto motive force for changing the stator field from an *n*-pole field to a 3*n* pole field.

13. In a dynamo electric machine, the combination with a stationary member having 3*n* mechanical poles, of a revolving member having an *n*-pole winding, main brushes and auxiliary brushes displaced sixty electrical degrees from the main brushes, each brush being located between adjacent mechanical poles, main exciting coils on the poles adjacent to the main brushes and connected in series between a main and an auxiliary brush, and adjusting coils on the same poles as the main exciting coils, said adjusting coils being connected in parallel with the main brushes.

14. In a dynamo electric machine, the combination with a stationary member having 3*n* mechanical poles, of a revolving member having an *n*-pole winding, main brushes and auxiliary brushes displaced sixty electrical degrees from the main brushes, each brush being located between adjacent mechanical poles, main exciting coils on the poles adjacent to the main brushes and connected in series between a main and an auxiliary brush, and neutralizing coils on the same poles as the main exciting coils.

15. In a dynamo electric machine, the combination with a stationary member having 3*n* mechanical poles, of a revolving member having an *n*-pole winding, main brushes and auxiliary brushes displaced sixty electrical degrees from the main brushes, each brush being located between adjacent mechanical poles, main exciting coils on the poles adjacent to the main brushes and connected in series between a main and an auxiliary brush, and adjusting coils on the remaining mechanical poles, said coils being connected in parallel to the main brushes.

16. In a dynamo electric machine, the combination with a stationary member having 3*n* mechanical poles, of a revolving member having an *n*-pole winding, main brushes and auxiliary brushes displaced sixty electrical degrees from the main brushes, each brush being located between adjacent mechanical poles, main exciting coils on the poles adjacent to the main brushes and connected in series between a main and an auxiliary brush, and auxiliary coils on the remaining mechanical poles connected to carry at least part of the load current.

17. In a dynamo electric machine, the combination with a stationary member having 3*n* mechanical poles each provided with a coil, of a revolving member having an *n*-pole winding, main brushes and auxiliary brushes displaced by sixty electrical degrees from the main brushes, and means connecting certain of the coils on the stationary member in series with a main and an auxiliary brush.

18. In a dynamo electric machine, the combination with a stationary member having 3*n* mechanical poles each provided with a coil, of a revolving member having an *n*-pole winding, main brushes and an auxiliary brush, each of said brushes being located between adjacent poles, and means connecting certain of the coils on the stationary member in series with a main and an auxiliary brush.

19. In a dynamo electric machine, the combination with a stationary member having 3*n* mechanical poles and windings on certain of said poles, of a revolving member having main brushes and an auxiliary brush each brush being located in an inter-polar space, and an exciting circuit comprising the auxiliary brush, a main brush, and windings on poles adjacent to a main brush.

20. In a dynamo electric machine, the combination with a stationary member having 3*n* mechanical poles and windings on certain of said poles, of a revolving member having main brushes and an auxiliary brush, and an exciting circuit comprising the auxiliary brush, a main brush and windings on poles adjacent to a main brush, and a working circuit comprising the main brushes and a winding on the stationary member, said winding being displaced by 90 electrical degrees from said main brushes.

21. In a dynamo electric machine, the combination with a stationary member having 3*n* mechanical poles and exciting windings on certain of said poles, of a revolving member having main brushes and an auxiliary brush each located in an inter-polar space, an exciting circuit comprising the auxiliary brush, a main brush, and the exciting windings on poles adjacent to a main brush, and means for neutralizing the armature reaction along the axis of the main brushes.

22. In a dynamo electric machine, the combination with a field structure comprising 3*n* equally spaced mechanical poles and windings thereon, of an armature having an *n*-pole winding, main brushes and an auxiliary brush, each brush being located between adjacent mechanical poles, and an exciting circuit comprising the main brushes, an auxiliary brush and windings on poles adjacent to a main brush, and a working circuit comprising the main brushes and a winding displaced approximately ninety electrical degrees from said main brushes.

23. In a dynamo electric machine, the combination with a stationary member having 3*n* mechanical poles and exciting windings adapted to produce an *n*-pole field distributed over all the mechanical poles, of a revolving member having an $n$-pole winding, main and auxiliary brushes, an exciting circuit comprising a main and an auxiliary brush and certain of the exciting windings, and means for producing a magneto motive force for changing the stator field from an $n$-pole field to a $3n$ pole field.

24. In a dynamo electric machine, the combination with a stationary member having $3n$ mechanical poles and exciting windings adapted to produce an $n$-pole field distributed over all the mechanical poles, of a revolving member having an $n$-pole winding, main and auxiliary brushes, an exciting circuit comprising a main and an auxiliary brush and certain of the exciting windings, means for producing a magneto motive force for changing the stator field from an $n$-pole field to a $3n$ pole field, and means for neutralizing the armature reaction along the axis of the main brushes.

25. In a dynamo electric machine, the combination with a stationary member having $3n$ mechanical poles and exciting windings adapted to produce an $n$-pole field distributed over all the mechanical poles, of a revolving member having an $n$-pole winding, main and auxiliary brushes, each brush being located between mechanical poles, an exciting circuit comprising a main and an auxiliary brush and certain of the exciting windings, means for producing a magneto motive force for changing the stator field from an $n$-pole field to a $3n$ pole field, and adjusting windings on the poles adjacent to the main brushes and connected in parallel with said brushes.

In testimony whereof, I have hereunto set my hand and affixed my seal in the presence of the two subscribing witnesses.

VALÈRE ALFRED FYNN. [L. S.]

Witnesses:
ELIZABETH BAILEY,
W. A. ALEXANDER.

Copies of this patent may be obtained for five cents each, by addressing the "Commissioner of Patents, Washington, D. C."